Jan. 11, 1966  W. L. KNOWLES  3,229,009
METHOD AND APPARATUS FOR FORMING COMPOSITION BOARD
Filed Sept. 14, 1962  13 Sheets-Sheet 1

INVENTOR
WILLIAM L. KNOWLES
BY
Kimmel & Crowell
ATTORNEYS

Jan. 11, 1966 W. L. KNOWLES 3,229,009
METHOD AND APPARATUS FOR FORMING COMPOSITION BOARD
Filed Sept. 14, 1962 13 Sheets-Sheet 3

INVENTOR
WILLIAM L. KNOWLES

Kimmel & Crowell
ATTORNEYS

Jan. 11, 1966  W. L. KNOWLES  3,229,009
METHOD AND APPARATUS FOR FORMING COMPOSITION BOARD
Filed Sept. 14, 1962  13 Sheets-Sheet 4

INVENTOR
WILLIAM L. KNOWLES

BY
Kimmel & Crowell
ATTORNEYS

Jan. 11, 1966 W. L. KNOWLES 3,229,009
METHOD AND APPARATUS FOR FORMING COMPOSITION BOARD
Filed Sept. 14, 1962 13 Sheets-Sheet 5

INVENTOR
WILLIAM L. KNOWLES

BY Kimmel & Crowell
ATTORNEYS

Jan. 11, 1966     W. L. KNOWLES     3,229,009
METHOD AND APPARATUS FOR FORMING COMPOSITION BOARD
Filed Sept. 14, 1962     13 Sheets-Sheet 6

INVENTOR
WILLIAM L. KNOWLES
BY Kimmel & Crowell
ATTORNEYS

Jan. 11, 1966   W. L. KNOWLES   3,229,009
METHOD AND APPARATUS FOR FORMING COMPOSITION BOARD
Filed Sept. 14, 1962   13 Sheets-Sheet 7
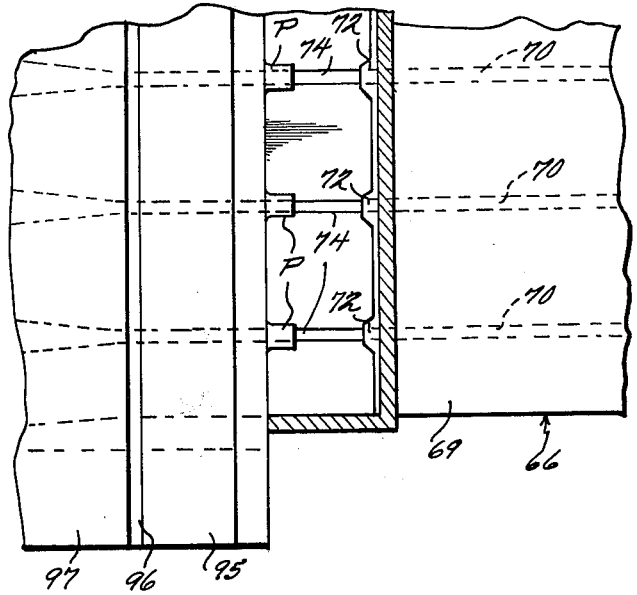
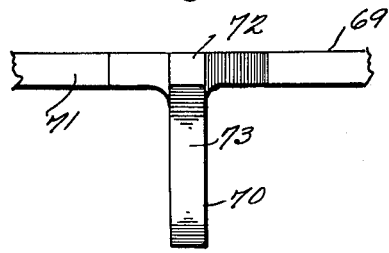
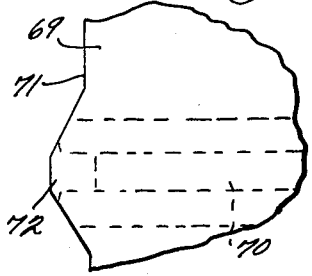
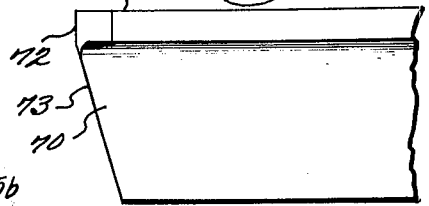
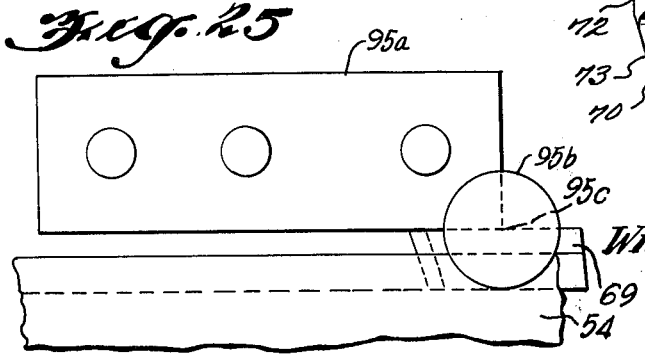
INVENTOR
WILLIAM L. KNOWLES
BY Kimmel & Crowell
ATTORNEYS Jan. 11, 1966 W. L. KNOWLES 3,229,009
METHOD AND APPARATUS FOR FORMING COMPOSITION BOARD
Filed Sept. 14, 1962 13 Sheets-Sheet 8
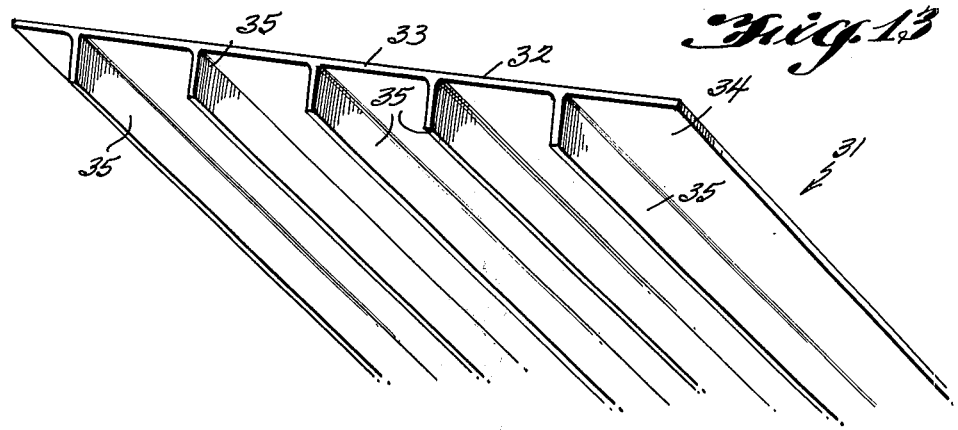
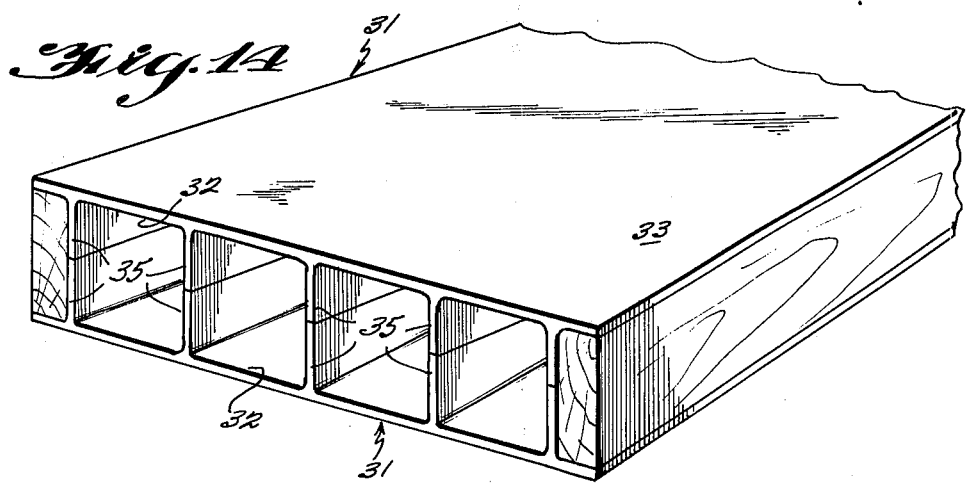
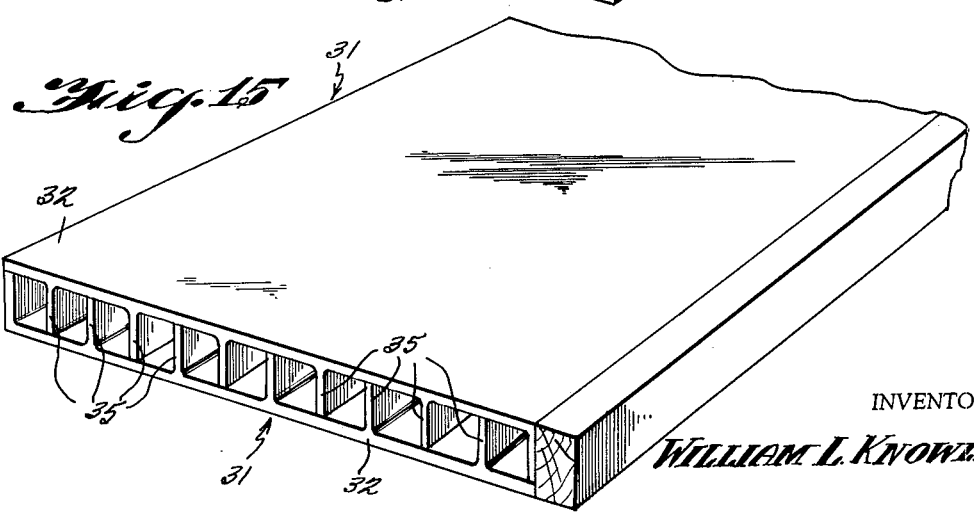
INVENTOR
WILLIAM L. KNOWLES
BY Kimmel & Crowell
ATTORNEYS

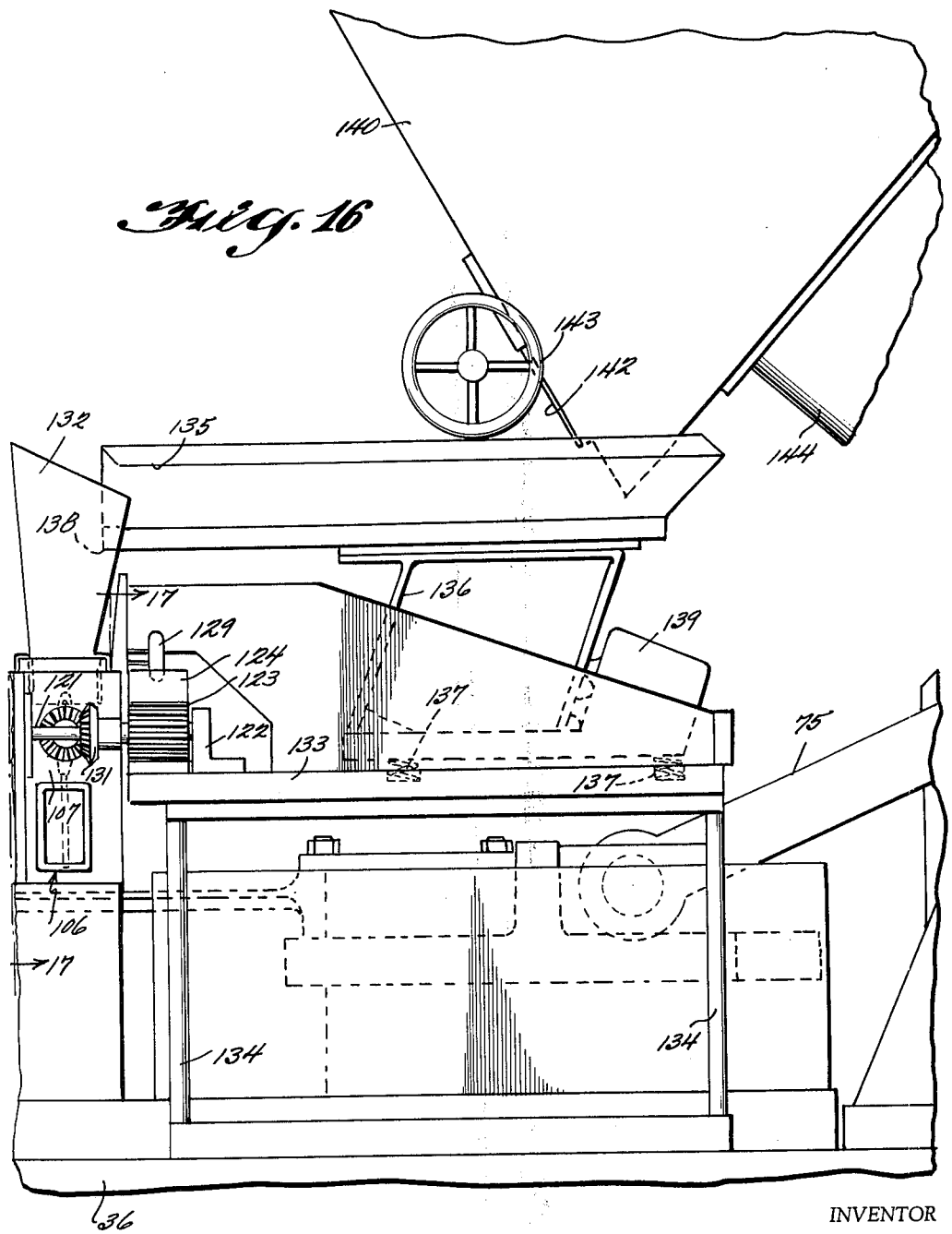

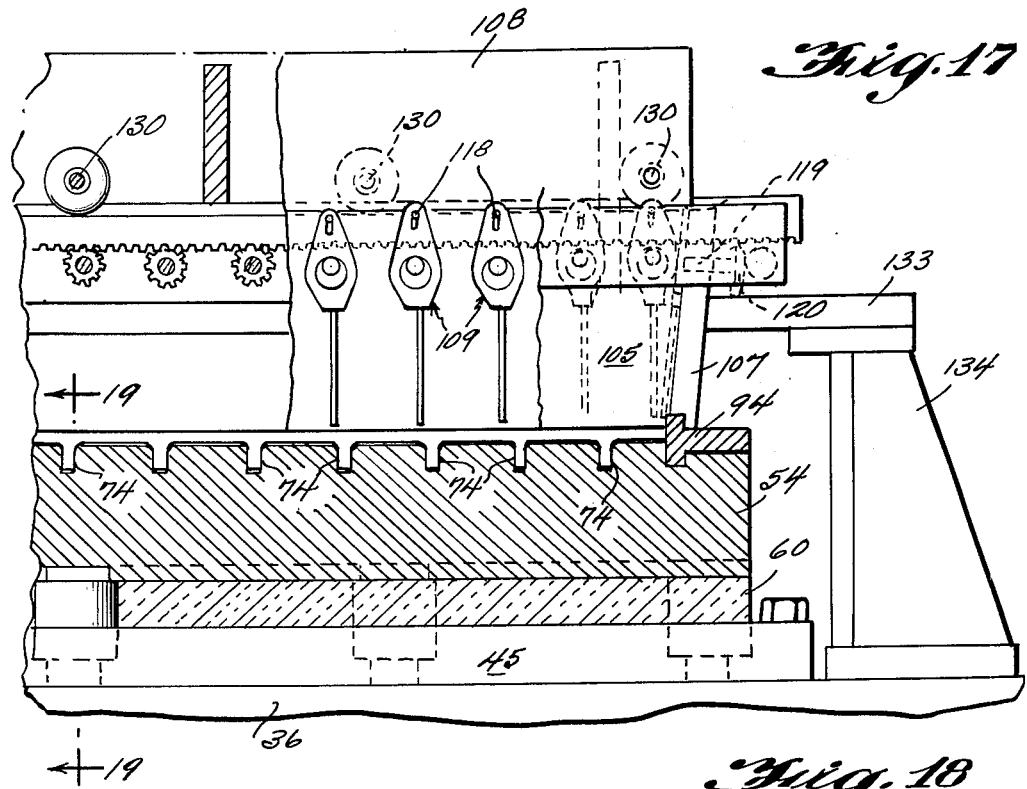
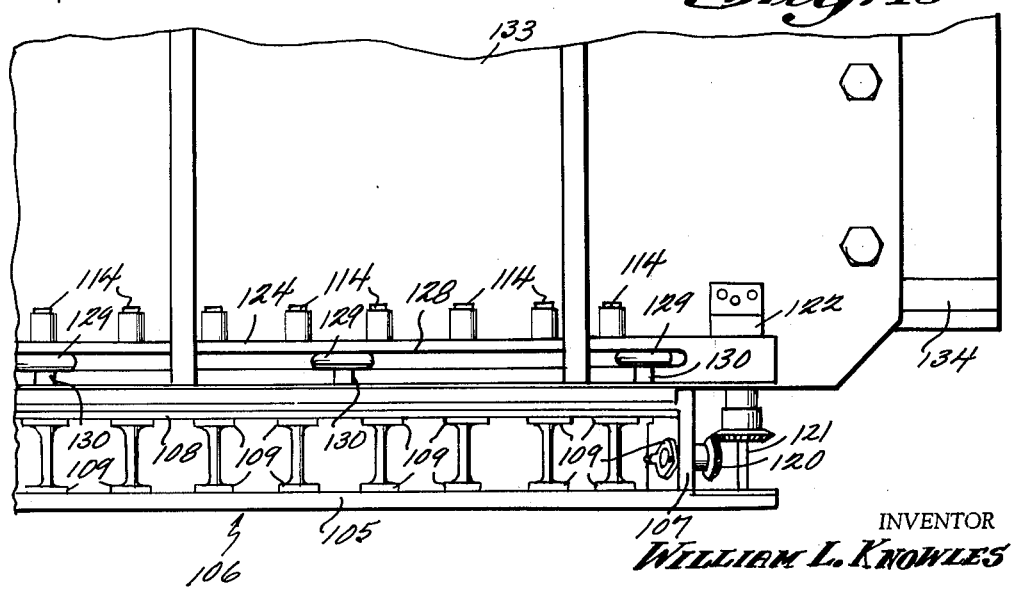

Jan. 11, 1966  W. L. KNOWLES  3,229,009
METHOD AND APPARATUS FOR FORMING COMPOSITION BOARD
Filed Sept. 14, 1962  13 Sheets-Sheet 11
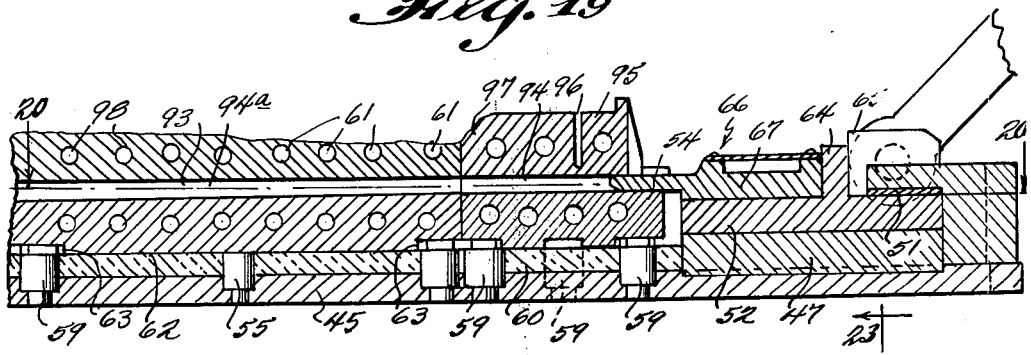
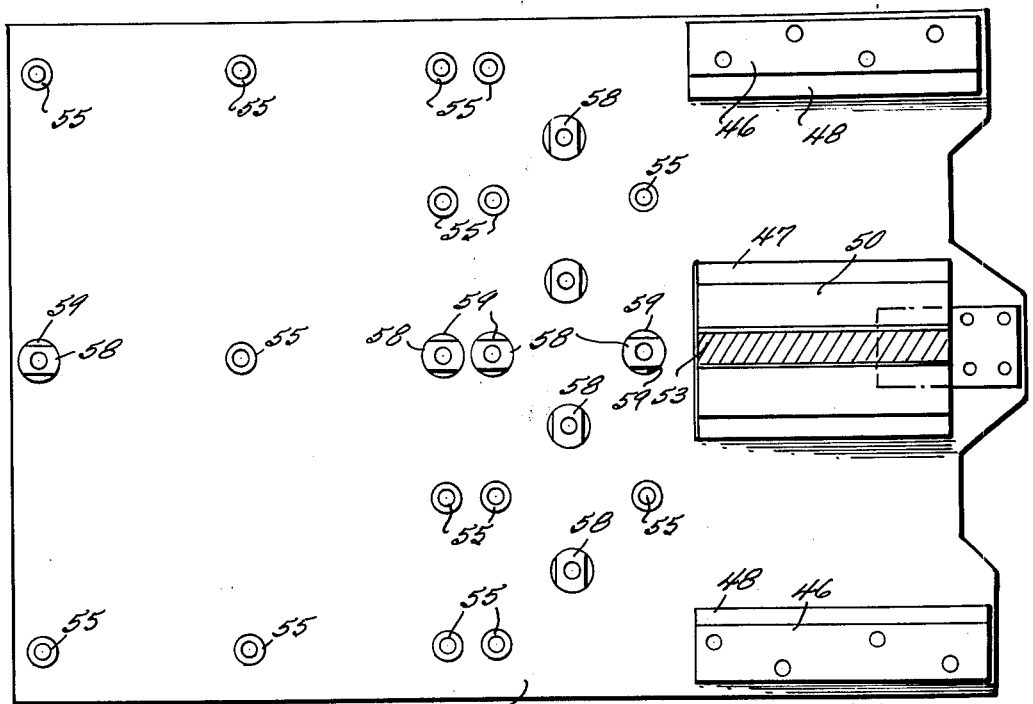
INVENTOR
WILLIAM L. KNOWLES
BY Kimmel & Crowell
ATTORNEYS Jan. 11, 1966 W. L. KNOWLES 3,229,009
METHOD AND APPARATUS FOR FORMING COMPOSITION BOARD
Filed Sept. 14, 1962 13 Sheets-Sheet 12

INVENTOR
WILLIAM L. KNOWLES
BY Kimmel & Crowell
ATTORNEYS

Jan. 11, 1966 W. L. KNOWLES 3,229,009
METHOD AND APPARATUS FOR FORMING COMPOSITION BOARD
Filed Sept. 14, 1962 13 Sheets-Sheet 13
Fig. 23
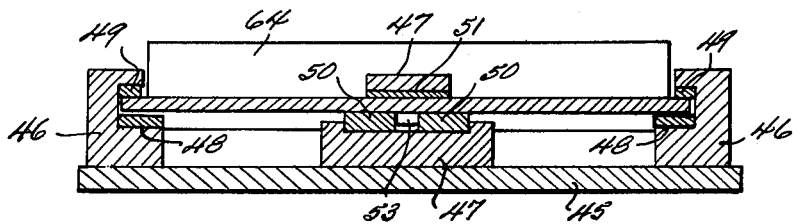
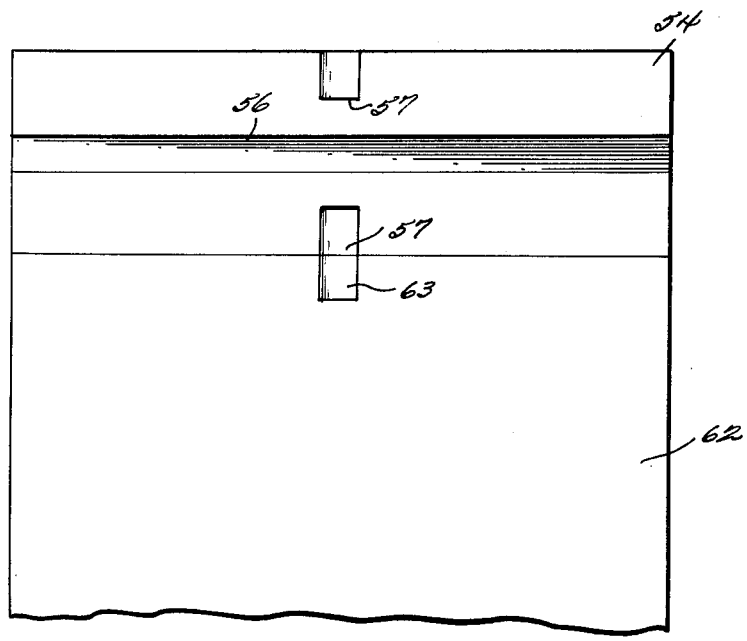
Fig. 24
INVENTOR
WILLIAM L. KNOWLES
BY Kimmel & Crowell
ATTORNEYS United States Patent Office 3,229,009
Patented Jan. 11, 1966

3,229,009
METHOD AND APPARATUS FOR FORMING COMPOSITION BOARD
William L. Knowles, Dallas, Tex., assignor to T-Board Machinery Company, Inc., Dallas, Tex., a corporation of Texas
Filed Sept. 14, 1962, Ser. No. 226,766
23 Claims. (Cl. 264—122)

This application is a continuation-in-part of application Serial No. 796,119, filed February 27, 1959, now abandoned.

The present invention relates to a method of making composition board and the apparatus in which the board is formed from its constituent materials.

The primary object of the invention is to provide an apparatus in which a composition sawdust resin binder reinforced board of severe cross-sectional shape is formed with a continuous flow process by successive compressive forces applied to the sawdust and resin binder.

Another object of the invention is to provide an extrusion molding process and apparatus for forming a composition sawdust and resin binder board of severe cross-sectional shape wherein the density of the product is controlled by varying the frictional area through which the product passes on its way through the apparatus.

Another object of the invention is to provide an apparatus of the class described above in which the molding pressures may be varied during the molding operation by hand actuated means.

A further object of the invention is to provide an apparatus of the class described above in which the continuous molding of the composition board is automatically performed.

A still further object of the invention is to provide a method and apparatus for forming composition board, each of which are economical and permit the formation of panels of a high strength factor from relatively inexpensive materials.

For a more complete understanding of the present invention and for further objects and advantages thereof, reference may now be had to the following description taken in conjunction with the accompanying drawings in which:

FIGURE 9 is an enlarged fragmentary vertical sectional view taken along the line 9—9 of FIGURE 6, looking in the direction of the arrows;

FIGURE 10 is a fragmentary front elevation of the compression piston;

FIGURE 11 is a fragmentary top plan view of the structure illustrated in FIGURE 10;

FIGURE 12 is a fragmentary side elevation of the structure shown in FIGURE 10;

FIGURE 13 is a fragmentary perspective view of the reinforced composition board;

FIGURE 14 is a fragmentary perspective view of a panel formed from the composition board;

FIGURE 15 is a fragmentary perspective view of another panel formed from the composition board;

FIGURE 16 is a fragmentary side elevation of the invention, illustrating the feed mechanism therefor;

FIGURE 17 is an enlarged fragmentary sectional view taken along the line 17—17 of FIGURE 16, looking in the direction of the arrows;

FIGURE 18 is a fragmentary top plan view of the structure illustrated in FIGURE 17;

FIGURE 19 is a fragmentary vertical sectional view taken along the line 19—19 of FIGURE 17, looking in the direction of the arrows;

FIGURE 20 is a horizontal sectional view taken along the line 20—20 of FIGURE 19, looking in the direction of the arrows;

FIGURE 23 is a fragmentary vertical sectional view taken on the line 23—23 of FIGURE 20, looking in the direction of the arrows;

FIGURE 24 is a fragmentary bottom plan view of the bottom mold; and

FIGURE 25 illustrates an alternative upper mold construction and support.

Figure 1:
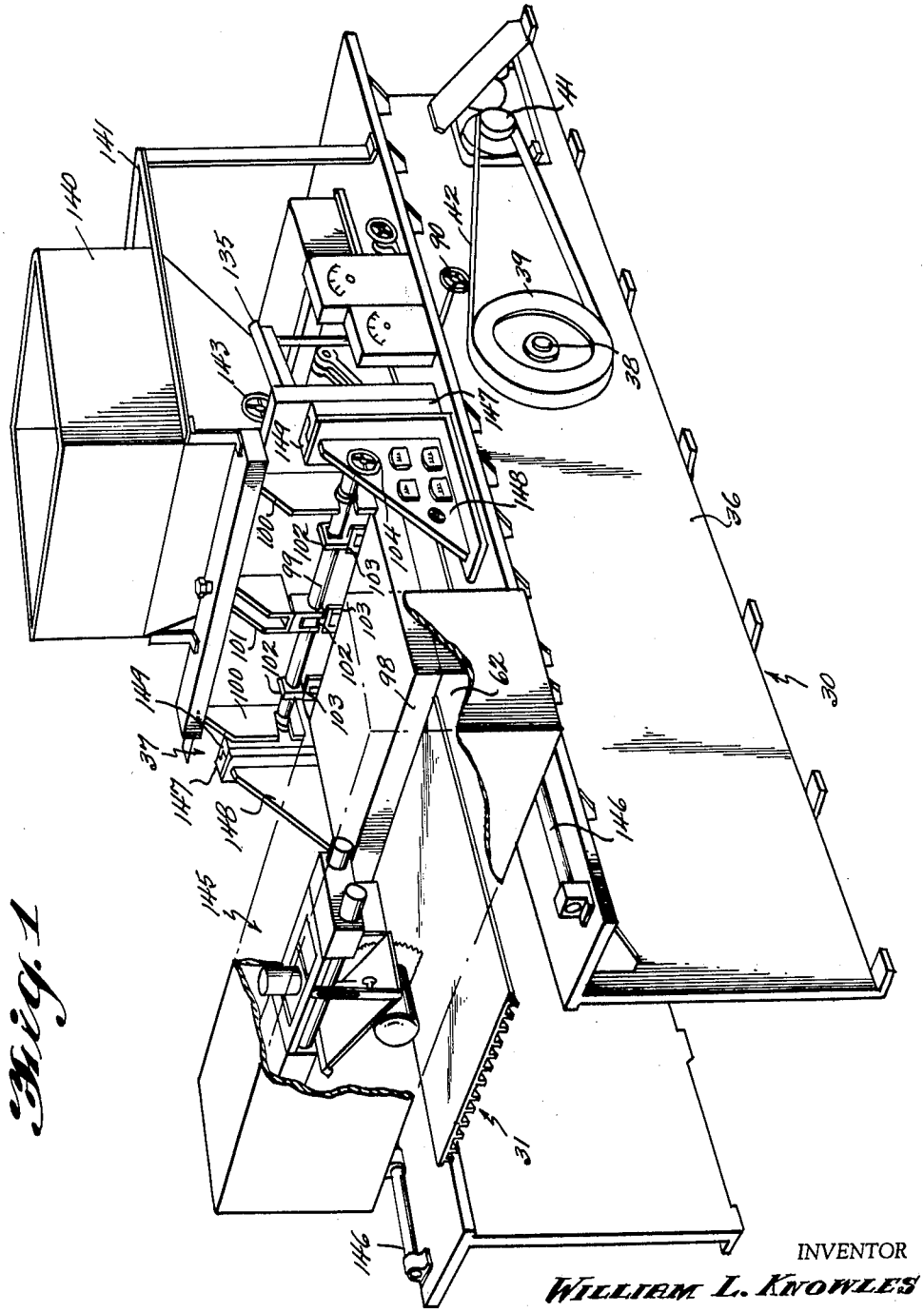
FIGURE 1 is a perspective view of the invention shown partially broken away and in section for convenience of illustration.
Figure 2:
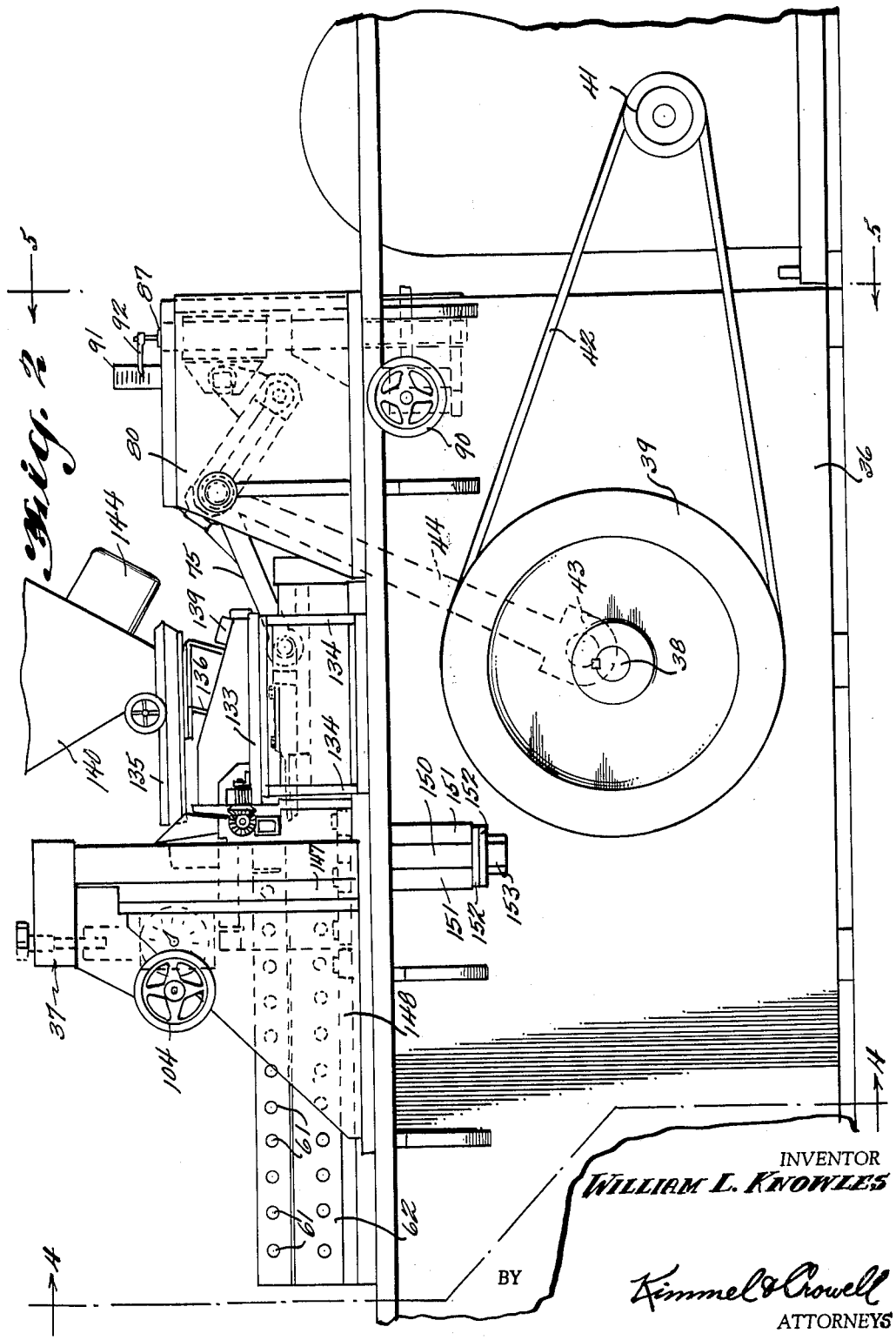
FIGURE 2 is a fragmentary side elevation of the invention shown partially broken away for convenience of illustration.
Figure 3:
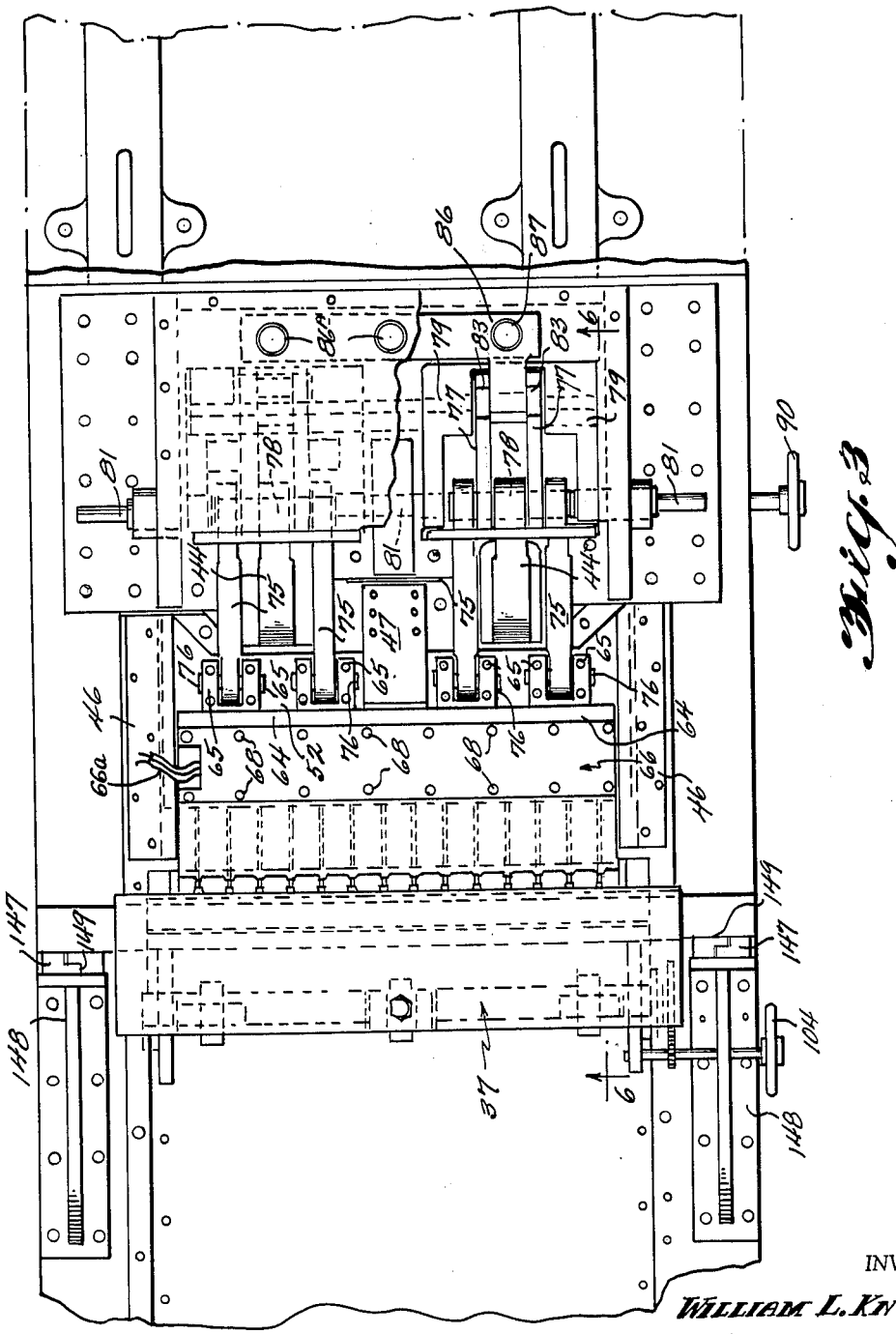
FIGURE 3 is a fragmentary top plan view of the invention shown partially broken away for convenience of illustration, with the hopper and feed mechanism removed.
Figure 4:
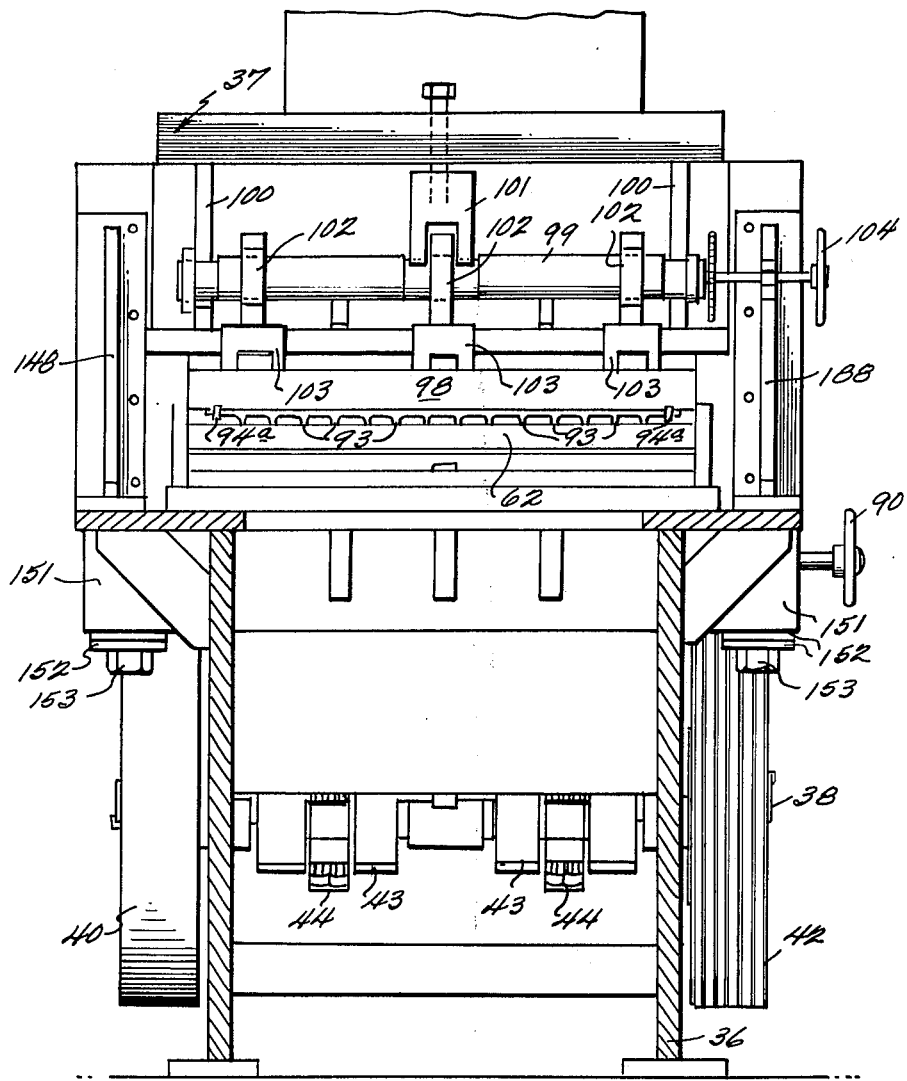
FIGURE 4 is a fragmentary transverse vertical section taken along the line 4—4 of FIGURE 2, looking in the direction of the arrows.
Figure 5:
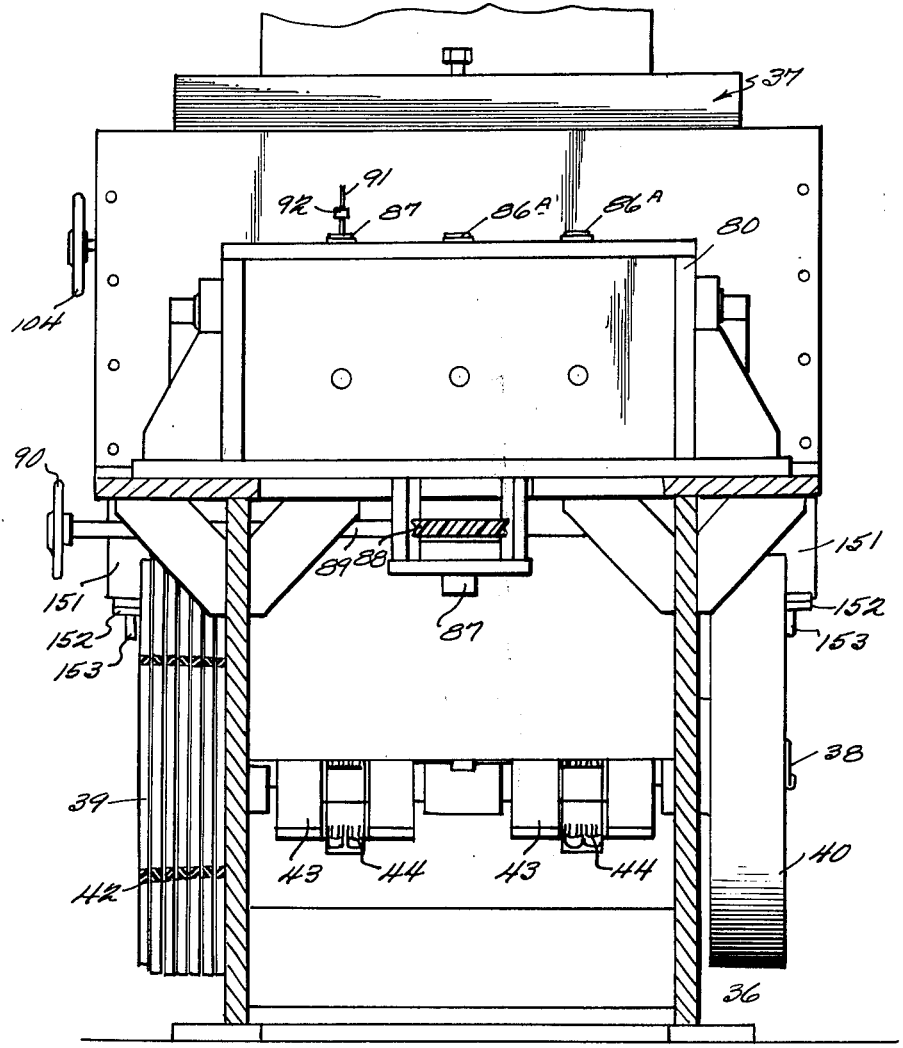
FIGURE 5 is a fragmentary transverse vertical section taken along the line 5—5 of FIGURE 2, looking in the direction of the arrows.

Referring now to the drawings in detail wherein like reference characters indicate like parts throughout the several figures, the reference numeral 30 indicates generally an apparatus in which a composition board, indicated generally at 31, is formed.

The composition board 31 includes a generally flat panel 32 having an upper surface 33 and a lower surface 34. A plurality of spaced apart parallel bars 35 depend integrally from the lower surface 34 of the panel 32 and have a thickness substantially equal to the thickness of the panel 32. The bars 35 extend perpendicularly outwardly from the panel 32.

In FIGURES 14 and 15, the composition boards 31 are illustrated formed into a relatively thick and a relatively thin panel for use in doors, walls and other structures requiring a lightweight, strong, rigid panel.

The composition board 31 is formed from ligno-cellulose particles including but not restricted to wood sawdust, wood chips and other similar material, all preferably of the size that will pass through a 10 mesh screen, combined with a suitable resin binder. The term "sawdust" as used in the specification and claims is intended to be generic to the ligno-cellulose particles mentioned above. The quality and characteristics of the board may be varied by the use of different binders and additives, such as wax emulsions and/or stearates for lubrication and moisture resistance, ammonium sulphate for fire resistance, and the like, without departing from the scope of the invention.

Ligno-cellulose particles, such as sawdust, cannot be molded or pressed into shapes requiring "deep draw" or forms having severe cross-sectional shapes because of the extremely low flow characteristics of wood. Pressure alone will not cause wood particles to seek the area of least resistance within a mold cavity. Since loose wood particles have a high compression ratio when formed into products dense enough to be usable, it is impossible to load a mold of the shape described uniformly in all areas with a volume sufficient to compress to uniform density. This problem is separate and apart from limitations in mold sizes and cost which are overcome by the present process.

The present process permits the use of any type or species of ligno-cellulose particles and any mixture thereof, since each type of such particles has a different density, and quite often a different shape. Each of the particles requires different pressures to develop the same density in a final product. This causes each type particle to have a different co-efficient of friction.

Essentially the present process is an extrusion process in that the feeding and mold loading, as well as the machine function, permit a continuous flow of finished product to be emitted therefrom. Hence, density within the product is created by controlling the frictional area through which the ligno-cellulose particles pass.

This process permits uniform feeding of the unevenly shaped mold, the uniform distribution within the mold areas, and control of density through controlling frictional surfaces while the machine is functioning so that any density product may be made uniformly while any type ligno-cellulose particles, or mixtures thereof, are being used. Higher density woods and ligno-cellulose particles have a higher co-efficient of friction than lower density materials and hence the length of pressure applying mold surfaces through which the material is forced is varied with each type of particle.

Another problem is the inherent variations in the moisture content of the ligno-cellulose particles, and the resulting mass following its blending with the resin binder. It is impractical to maintain ligno-cellulose material at an absolute uniform moisture content. Irrespective of the type of ligno-cellulose particles, the higher the moisture content the longer it takes under pressure to form a finished product. As described above, the final density of the product in this process is created by friction, and controlling the density of the finished product is provided by controlling the length of mold surface under pressure. The present process incorporates further devices for controlling the friction surface and pressure on the product while the material is being processed so as to permit variations in moisture content, and yet obtain a desired final density in the product.

The apparatus 30 includes a base frame 36 having an upstanding inverted, U-shaped frame, indicated generally at 37, supported thereon intermediate the opposite ends thereof. A shaft 38 extends transversely of and is journalled in the frame 36 with a multiple belt pulley 39 mounted on one end and a flywheel 40 mounted on the other end. A power unit 41 is coupled to the pulley 39 by a plurality of V-belts 42 extending therebetween. The shaft 38 is provided with a pair of crank throws 43 arranged in spaced apart relation with a pair of spaced apart parallel connecting rods 44 journalled thereon and extending upwardly therefrom.

A horizontal guide block 45 is secured to the frame 36 in generally overlying relation to the shaft 38. The guide block 45 has a pair of oppositely disposed horizontal slide bearings 46 and a central horizontal slide bearing 47 secured thereto adjacent one end thereof. The slide bearings 46 have a relatively wide bottom wear plate 48 and a relatively narrow top wear plate 49, arranged in vertically spaced parallel relation thereabove. The central slide bearing 47 has a pair of longitudinally extending spaced apart lower wear plates 50 and a relatively short upper wear plate 51 arranged in vertically spaced parallel relation to the wear plate 50.

A slide block 52 is arranged in vertically spaced parallel relation above the guide block 45 and has the opposite side edges thereof engaged between the bottom wear plates 48 and the top wear plate 49. The slide block 52 is supported centrally on the lower wear plates 50 and engages beneath the upper wear plate 51. A central longitudinally extending, generally rectangular bead 53 is integrally secured to the under side of the slide block 52 and engages between the lower wear plates 50 to maintain the slide block 52 in longitudinally aligned relation with respect to the guide block 45.

A generally rectangular lower mold 54 is arranged in spaced parallel relation above the guide block 45 and is supported thereabove on a plurality of posts 55 which engage the undersurface of the mold 54. The mold 54 is provided with a generally rectangular transverse groove 56 and a second generally rectangular longitudinal groove 57 extending along the longitudinal center line of the lower mold 54. A plurality of posts 58 are arranged in a transverse line and have parallel opposite flat sides 59 which engage in the groove 56. Additional posts 58 are arranged on the longitudinal center line of the guide block 45 and have the opposed parallel flat surfaces 59 thereon arranged parallel to the longitudinal center line. The posts 58 on the longitudinal center line of the guide block 45 are engaged in the groove 57 to lock the lower mold 54 against movement, either longitudinally or transversely, with respect to the guide block 45. The arrangement of the posts 58 engaging in the grooves 56, 57 permits the lower mold 54 to expand outwardly from center, both transversely and longitudinally, when heated.

The lower mold 54 is spaced in parallel relation above the guide block 45 and has a relatively flat insulating plate 60 filling the space therebetween. The lower mold 54 has a plurality of heating elements 61 extending therethrough, for reasons to be assigned.

A lower cooking member 62 is supported in horizontally aligned relation to the lower mold 54 on a plurality of posts 55 extending upwardly from the guide block 45. The lower cooking member 62 has a longitudinally extending groove 63 formed therein into which the flattened sides 59 of a pair of longitudinally centered posts 58 extend. The lower cooking member 62 has a plurality of heating elements 61 extending therethrough.

An upright transverse bar 64 is integrally formed on the slide block 52 intermediate the front and rear edges thereof, as can be clearly seen in FIGURE 19. The slide block 52 is provided with a plurality of spaced pairs of ears 65 mounted on the upper surface thereof and extending rearwardly from the upstanding transverse bar 64.

A mold piston, generally indicated at 66, has a generally rectangular body 67 engaging the upper surface of the slide block 52 forwardly of the transverse bar 64, and is secured to the slide block 52 by a plurality of spaced apart bolts 68. The body 67 has a generally horizontal flat panel 69 extending forwardly therefrom and having a plurality of spaced apart parallel perpendicularly depending legs 70 integrally secured thereto in longitudinally extending relation. The forward edge 71 of the panel 69 has a forwardly offset portion 72 overlying the forward ends of each of the legs 70. The legs 70 have the forward face 73 thereof sloping downwardly and rearwardly from the projection 72 on the panel 69. The legs 70 on the panel 69 engage in a plurality of grooves 74 formed in longitudinally extending relation in the upper surface of the lower mold 54.

A link arm 75 has the forward end thereof positioned between each pair of ears 65 and is pivotally secured thereto by stub shafts 76. The link arms 75 are arranged in spaced parallel rearwardly extending pairs with each pair engaging on opposite sides of a second pair of links 77. The links 77 and the link arms 75 are pivotally connected to the upper end of the connecting rod 44 by means of a transversely extending pivot pin 78. A stirrup 79 is secured to upstanding frame members 80 by means of pivot pins 81. The links 77 have the ends thereof opposite the pivot pins 78 secured to the stirrup 79 by means of a pivot pin 82. The stirrup 79 is provided with an upstanding pair of laterally spaced ears 83. A centrally squared shaft 84 is journalled in the ears 83 and engages in a horizontal generally rectangular slot 85 formed in a transversely extending horizontal control bar 86. The control bar 86 is mounted on a plurality of vertically extending control rods 86A and a vertically extending control screw 87. The screw 87 is moved vertically by means of a nut 88 driven by a worm gear 89 under control of a hand wheel 90. Vertical swinging movement of the stirrup 79 about the pivot 81 changes the effective throw of the connecting rod 44 by bodily moving the links 77 and the link arms 75 longitudinally.

An indicator scale 91 is mounted on the frame member 80 adjacent the upper end of the screw 87 and an indicator pointer 92 is secured to the upper end of the screw 87, cooperating with the scale 91 to indicate the relative adjusted position of the screw 87 so as to permit the accurate adjustment of the throw of the links 75, 77.

Figure 7:
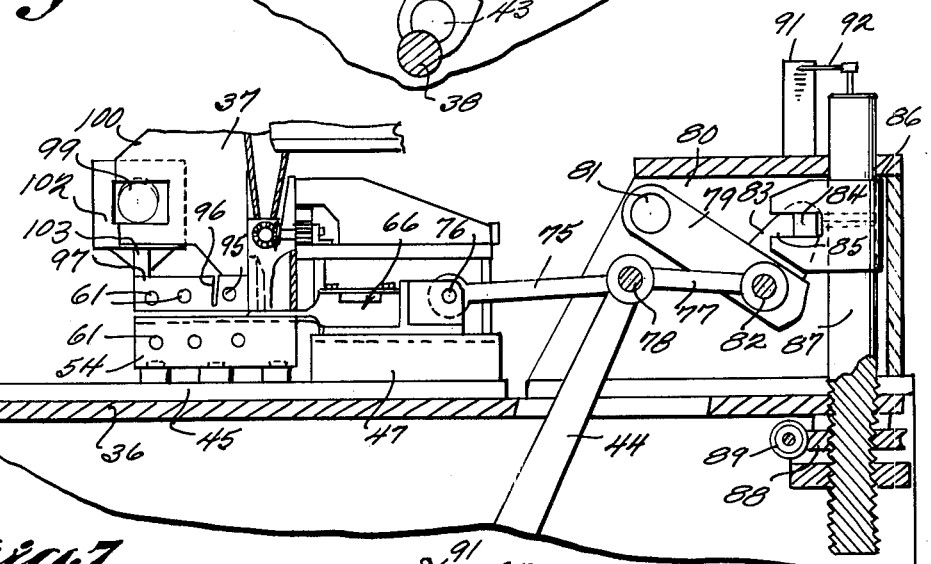
FIGURE 7 is a view similar to FIGURE 6 illustrating the drive mechanism in another position.
Figure 8:
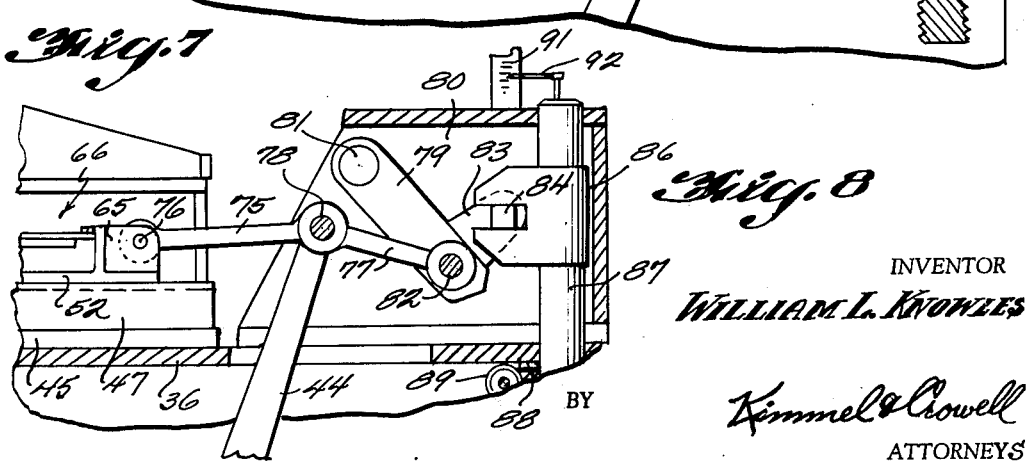
FIGURE 8 is a view similar to FIGURE 6 illustrating the drive mechanism in still another position.

The distance between the axis of pivot pin 81 and the axis of pivot pin 82 is identical to the distance between the axis of pivot pin 82 and the axis of pivot pin 78 so that the link 77 can swing about pivot pin 82 to a point where the pivot pin 78 becomes axially aligned with the pivot pin 81. The alignment of the pivot pins 78 and 82 occurs with the connecting rod 44 in its uppermost position and with the mold piston 66 in its rearmost position. By swinging the stirrup 79 downwardly from the position illustrated in FIGURES 6 and 7 to the position illustrated in FIGURE 8, the link 77 and the link arm 75 are moved forwardly so that the stroke of the mold piston 66 is increased. However, regardless of the position of the stirrup 79, the mold piston 66 will be withdrawn to the same beginning position on each revolution of the shaft 38 since the uppermost position of the connecting rod 44 will always cause the pivot pin 78 to become aligned with the pivot pin 82. With this structure the actual length of the stroke of the mold piston 66 can be changed while the apparatus is in full operation.

The lower cooking member 62 is provided with a plurality of longitudinally extending slots 93 arranged in aligned relation to the slots 74 in the lower mold 54. A longitudinally extending T-bar 94 is arranged at each edge of the lower mold 54. An upper mold 95 arranged in overlying relation to the mold 54 is rigidly secured to the U-shaped frame 37 and engages the T-bars 94 to maintain the upper mold 95 in alignment with the lower mold 54. The upper mold 95 has a plurality of heating elements 61 extending therethrough to heat the mold 95 to assist in the curing of the product. The upper mold 95 has a transversely extending notch 96 formed therein to provide a trailing portion 97 of the mold 95 which can be vertically adjusted. The heating elements 61 are of any desired conventional type such as electric, steam, hot oil and the like. The lower cooking member 62 is provided with a longitudinally extending T-bar 94A adjacent each edge thereof and aligned with the T-bars 94.

An upper cooker member 98 is positioned forwardly of the upper mold 95 and is supported on the longitudinal T-bars 94A. The upper cooker member 98 also has a plurality of transversely extending heating elements 61 extending therethrough. The heating elements 61 of the lower mold 54, lower cooker member 62, upper mold 95 and the upper cooking member 98 are all separately controlled so that the desired temperature may be maintained. Means connected to lines 66a are provided to heat piston 66 to compensate for expansion of the mold structure.

The inner faces of the T-bars 94 taper outwardly to correspond to the other tapered faces of the mold cavity. The T-bars 94 serve to align the top and bottom molds and as side edges of the mold cavity therebetween. Alignment of the grooves in lower mold 54 with the grooves 93 in the lower cooking member 62 is achieved and maintained by the boss posts 58 on the guide block 45. Lower mold 54 and lower cooking member 62 are locked together at each edge so that cooking member 62 may float longitudinally with heat expansion, but may not become separated from mold 54.

An eccentric shaft 99 extends transversely of and behind the U-shaped frame 37. The shaft 99 is concentrically journalled at each end in gussets 100 fixed to the frame 37 and is concentrically supported against deflection intermediate its opposite ends by a bracket 101 mounted on the frame 37. A plurality of control blocks 102 encompass the shaft 99 in laterally spaced relation in eccentric areas of the shaft 99. A bracket 103 is fixed to the lower end of each of the control blocks 102 and is rigidly fixed to the trailing portion 97 of the upper mold 95. Rotation of shaft 99 by means of a hand wheel 104 is effective to raise or lower the trailing portion 97 of the mold 95 while the machine is working under pressure, thereby varying the horizontal spacing and parallelity of the horizontal surfaces of upper mold 95 and lower mold 54.

The leading edge of the upper mold 95 has horizontal protrusions P from its frontal surface, with each protrusion P being positioned over one of the grooves 74 in the lower mold 54.

The front wall 105 of the feed chamber box, indicated generally at 106, is positioned immediately over the leading edge of the upper mold 95 and has spaced apart parallel side walls 107 which overlie the longitudinal bars 94 which extend beyond the leading edge of the upper mold 95. A rear wall 108 is positioned in rearwardly spaced parallel relation to the front wall 105 and forms a material stop in the operation of the apparatus. The rear wall 108 is positioned so that its lower edge lies immediately above the leading edge of the piston 66 when it is in its rearmost position.

The feed chamber box 106 has a plurality of agitation fingers, indicated generally at 109, mounted in laterally spaced relation on the front wall 105, rear wall 108 and the opposite end walls 107. The agitation fingers 109 include an upper body portion 110 and a centrally disposed depending rod 111, secured to the lower end of the body 110. The body 110 has a vertically elongated slot 112 formed therein adjacent the upper end thereof and a relatively large bore 113 formd centrally of the body 110 spaced below the slot 112. A plurality of longitudinally extending shafts 114 have the ends 115 thereof journalled respectively in the rear wall 108 and front wall 105 in laterally spaced, horizontally aligned relation. The shafts 114 are parallel to each other and have an eccentric cam 116 formed adjacent each end thereof with the eccentric cams 116 being cylindrical to engage in the bores 113 of the bodies 110. Inwardly of the eccentric cam 116, an enlarged boss 117 is formed on the shaft 114 to retain the body 110 on the eccentric cam 116 between the respective front wall 105 or rear wall 108 and the boss 117. The front wall 105 and rear wall 108 are provided with a plurality of relatively short inwardly extending pivot pins 118 which extend through the slot 112 of each of the bodies 110 to retain the fingers 109 in their generally vertical position. On rotary movement of the shaft 114, the eccentric cam 116 will oscillate the feeding finger 109 from side to side, as well as simultaneously raise and lower the feeding finger 109.

Figure 21:
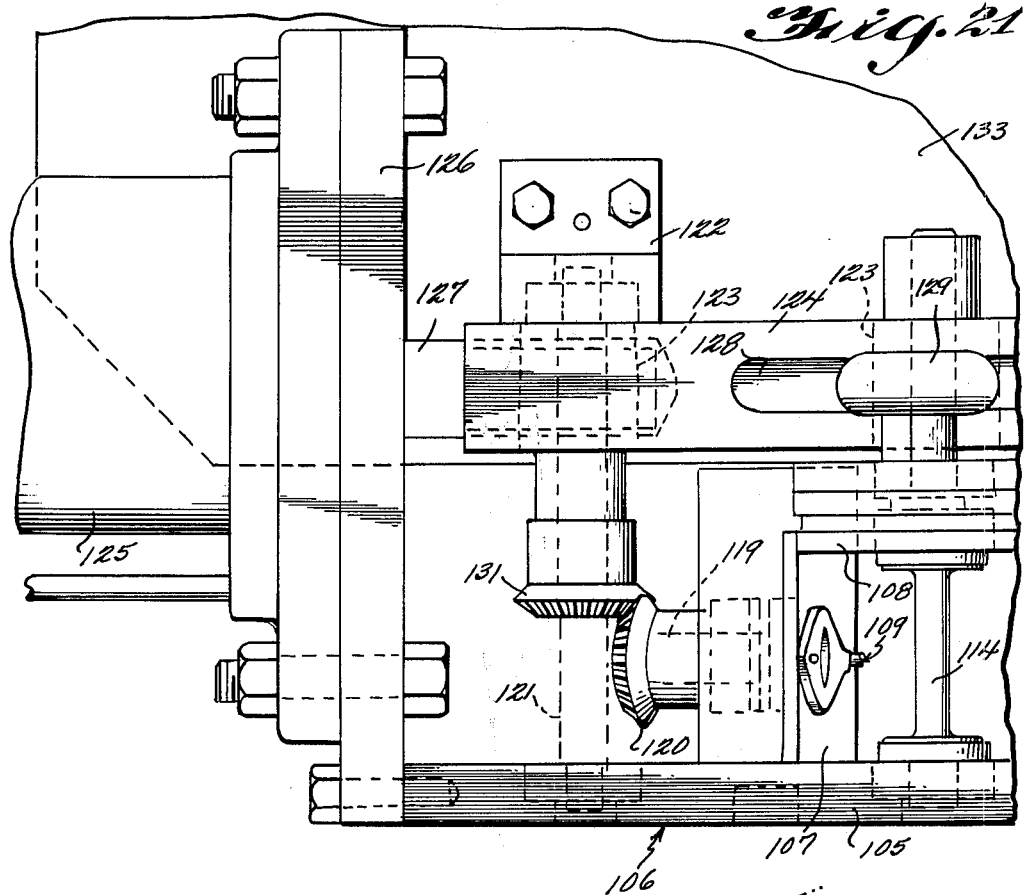
FIGURE 21 is an enlarged fragmentary plan view of the finger drive mechanism.
Figure 22:
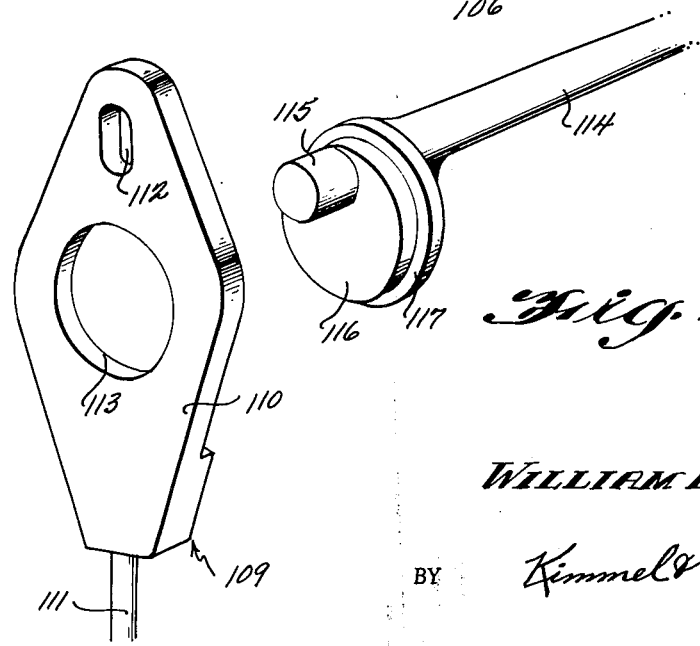
FIGURE 22 is an enlarged exploded perspective view of the finger drive mechanism.

The end walls 107 converge downwardly and each has a stub shaft 119 journalled therein. The stub shaft 119 has an eccentric cam 116 on its inner end for driving a feed finger 109 mounted on the end wall 107. The outer end of the stub shaft 119 has a bevel gear 120 secured thereto, as can be clearly seen in FIGURES 18 and 21. A shaft 121 is journalled in the front wall 105 and has its rear end journalled in a bracket 122 mounted rearwardly of the rear wall 108. The shafts 114 and 121 extend rearwardly beyond the rear wall 108 and are each provided with a spur gear 123. The spur gears 123 are arranged in horizontally and transversely aligned relation and each engage a rack bar 124 to be driven thereby.

A double-acting pneumatic ram 125 is positioned at one end of the feed box 106 and is detachably secured to an upstanding bracket 126. A piston rod 127 extends inwardly from the ram 125 and is secured to one end of the rack bar 124. The rack bar 124 has an elongated arcuate groove 128 formed in the upper surface thereof and is guided by a plurality of guide rollers 129 which are journalled on stub shafts 130 mounted in the rear wall 108.

In the operation of the feeder fingers 109, the gears 123 and the shafts 114 are rotated through a 180 degree arc and are then rotated in a 180 degree arc in the opposite direction.

Reciprocation of the rack bar 124 under the drive of the double-acting pneumatic ram 125 effects an alternate rotary movement to the shafts 114, 121 to oscillate the feed fingers 109. A bevel gear 131 is mounted on each of the shafts 121, meshing with the bevel gears 120 to drive the shaft 119 from the shaft 121.

A downwardly converging funnel guide 132 is mounted on the feed box 106 and diverges upwardly and outwardly therefrom. A platform 133 is supported in spaced parallel relation above the frame 36 on standards 134 and the feed box 106 is mounted on the forward end of the platform 133. A vibratory tray 135 is arranged in spaced apart relation above the platform 133 and has a base 136 resiliently supported on the platform 133 by means of a plurality of coil springs 137. The tray 135 has the forward end 138 thereof overlying the funnel guide 132 and extends rearwardly therefrom. An electrical vibrator 139 is secured to the base 136 and when operated vibrates the tray 135 to move material therein out the forward end 138 thereof.

A hopper 140 is supported on a skeleton frame 141 extending upwardly from the frame 36 in a position to overlie the vibratory tray 135. The hopper 140 has a sliding gate 142 arranged to control the outlet therefrom and actuated by a hand control wheel 143. The hopper 140 is provided with a vibrator 144 to move the material therein outwardly therefrom into the vibratory tray 135.

Immediately to the rear of the cooking members 62, 93 is positioned a longitudinally adjustable transversely reciprocating cut-off saw, generally indicated at 145. The cut-off saw 145 is positioned to sever the finished composition board 31 automatically through the use of conventional limit switches (not shown). The cut-off saw 145 moves longitudinally of the apparatus 30 on rails 146 mounted on the frame 36 so that the cutting operation does not interrupt the flow of the composition board 31 from the apparatus 30.

The U-shaped frame 37 has a pair of oppositely disposed L-shaped rails 147 secured thereto in spaced parallel upright relation. A pair of support gussets 148 are mounted on the frame 36 and carry a second pair of L-shaped guides 149 arranged in parallel upright relation thereon. The U-shaped frame 37 through the rails 147 and guides 149 is mounted for vertical sliding movement with respect to the frame 36.

A bolt 150 is secured by threading into each leg of the U-shaped frame 37 and depends therefrom extending below the top of the frame 36. Each bolt 150 extends between a pair of support arms 151 mounted on the frame 36. A pair of "Belleville Springs" 152 are mounted on each bolt 150 between the arms 151 and the head 153 of the bolt 150. The bolts 150 and the springs 152 restrain the U-shaped frame 37 against vertical movement until an extremely great predetermined pressure has been applied to the frame 37 by upward pressure of the upper mold 95. The U-shaped frame 37 has a strength sufficient to eliminate practically all deflection from the center thereof.

In the operation of the apparatus and the processing of the material automatically into composition board of uniform and desired density, the shaft 38 is rotated at varying rates of speed, adjustable by hand controls on the power unit 41. Slower speeds retard the rate of production and are desirable only when the types of resin binder or the quantity in the mix requires longer curing time.

The turning of the shaft 38 vertically reciprocates connecting rods 44 so as to move the links 77 and the link arms 75 and thereby horizontally reciprocate the mold piston 66. With the mold piston 66 in retracted position, the particle mixture in the feed box 106 flows onto the bottom mold 54 and into the grooves 74 therein. The mold piston 66 in reciprocating longitudinally carries uniform quantities of the particle mixture forwardly into the cavity between the lower mold 54 and the upper mold 95. The protrusions P on the leading edge of the upper mold 95 retard the flow of the mixture into a portion of the exposed length of the grooves 74, thus partially unifying the volume of material carried forwardly by the bars 70 of the piston 66 with the volume carried forward by the flat portion 69 of the mold piston 66. The slanting leading edge 73 on the bars 70 forms each charge of particle mixture in the grooves 74 at a slant; thus new charges carried forward by the bars 70 roll up this incline toward the horizontal portion of the cavity between the molds 54, 95. The protrusion 72 on the leading edge 71 of the mold piston 66 plows the material sideways toward the horizontal portions of the cavity, thus mechanically re-distributing loose material uniformly throughout the mold cavity which, in turn permits its compression into a uniform density of composition board. The slanting and staggered lines of formation in the board caused by the shape of the piston, assist in the formation of both stability and strength in the finished board.

The lower mold 54 and the upper mold 95 have parallel vertical and horizontal surfaces for a portion of their length, from which point all surfaces in the trailing areas of these molds are tapered away from the parallel areas which are the smallest dimensions of the cavity. Since, as heretofore described, the distance mold piston 66 enters the mold cavity can be adjusted while the machine is functioning without changing the distance it travels through the feed chamber, the function becomes to pick up the same volume of material each stroke, but carry the charge controlled but varying distances between the parallel portions of the mold cavity. Hence, by forcing material different distances between these surfaces, the length of the frictional surface travelled by the material under pressure will be varied.

The horizontal surfaces of the lower mold 54 and the upper mold 95 are tapered in their trailing areas and it is important to note that they are tapered away from the work, thereby increasing the size of the cavity. Since upper mold 95 can be flexed by the rotation of shaft 99 while the machine is functioning, the tapered surface of mold 95 can be brought into greater or less parallel relation with the horizontal surface of the lower mold 54. The adjustment of the upper mold 95 with respect to the lower mold 54 permits the surface contact of the material in the mold cavity to be varied without the full frictional resistance created by the totally parallel areas, thus permitting adjustments to compensate for varying physical characteristics, particularrly moisture content of the materials so that any desired density of product may be obtained.

The present process permits the continuous production of a composition board of odd and severe cross-sectional shape from any type of ligno-cellulose particles, particularly any species of wood particle, by mechanically and uniformly distributing the material to be compressed and for compensating for variations in the types of particles which through friction compress to different densities and by compensating for inherent variations in moisture content to arrive at a uniform density at any desired density in the final product.

It will be understood that by a simple inter-change of mold piston 66 and lower mold 54 that the thickness of the composition board can be altered, thus providing a greater versatility of end use of the composition board produced on the same apparatus.

FIGURE 13 is a fragmentary perspective view of a typical composition board 31 made by this process and FIGURE 14 illustrates one type of panel made with the composition board 31 when the bars 35 thereof are arranged in abutting relation to form a relatively thick panel. The edges and ends of such a panel can be sealed by the insertion of lumber or other material strips between the bars 35 at the edges and ends. Such a panel can be employed with the natural surfaces 33 of the composition board 31 revealed, or the surfaces may be finished with paint, paper, veneer, metal, plastic or in any other conventional manner desired.

FIGURE 15 illustrates another type of panel made with the same thickness of composition board 31, but having an over-all dimension much thinner than that of the panel shown in FIGURE 14, due to the fact that the bars 35 of opposing boards are interengaged. Panels of this construction may be sealed at the edges and ends as above recited, or by affixing in an abutting manner the sealer strip to the edges and ends of the engaged composition boards. Surfaces of these panels may be employed or finished, as above described.

Figure 6:
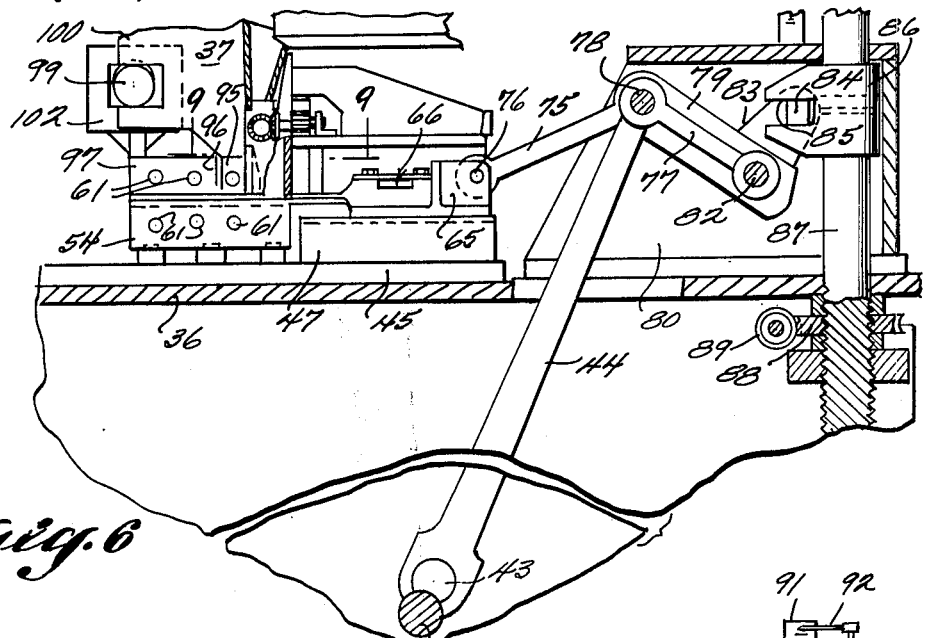
FIGURE 6 is an enlarged fragmentary vertical sectional view taken along the line 6—6 of FIGURE 3, looking in the direction of the arrows.

The foregoing description relating to a preferred embodiment of the invention provides for the extrusion of composition board from a mixture of Ligno-cellulose fines and resin. The upper mold structure 95 has a lower surface 94 which, in the present embodiment, is planar at the mouth of the cavity between the upper mold and the lower mold 54. The embodiment illustrated in the drawings includes a transversely grooved upper mold structure. The groove 96 permits the deformation of the upper mold so that pressure on the extruded material may be slightly relieved in the trailing portion of the cavity. This permits accommodation for variation in moisture content of the mixture by permitting a longer travel path in which heat transfer may take place while reducing the frictional forces to hold pressure and density of the product within controlled limits. The upper mold serves to form a first mold surface on the board, preferably of planar character. It may be found to be desirable to eliminate the groove 96 and make the upper mold 95 solid as shown in FIGURE 25 where the solid upper mold 95a has pivots 95b for mounting the upper mold 95a for rotation about the lower leading corner 95c thereof. A suitable locking mechanism as shown in FIGURE 6 may then be provided for limiting the slope of the upper mold from the leading edge to a downstream point thereby to permit a continuous increase in the thickness of the extrusion with the increase beginning at the very mouth of the cavity between the molds and continuing during travel of the extrusion through the cavity until the material in the extrusion assumes a set. In the embodiment shown in FIGURE 25, the upper mold is mounted on pivots 95b having their axis passing through the lower right-hand corner of the mold 95 as viewed in FIGURE 6.

The second mold structure 54 spaced from the upper mold structure has an uneven transverse mold surface for forming an uneven transverse profile on the surface of the board opposite the planar surface formed by the upper mold. In order to assure the production of extruded board of uniform density in spite of the uneven character of one of the surfaces, there is provided means for the control of the deposition of the mixture adjacent the mouth of the mold cavity and for introducing the mixture into the cavity which serves two functions. The first is that through the provision of the protrusions P, FIGURE 9, which overlie the slots in the lower mold, the mixture is deposited onto the lower mold unevenly in an areal sense. The feed path through which the mixture is deposited is uneven in a manner which may be considered to be the reciprocal of the opening or mouth of the cavity between the two molds. More particularly, as shown in FIGURE 9, where the mouth of the mold cavity is of large cross section by reason of the presence of the slots 74 in the lower mold, the path through which the mixture is deposited is smaller in cross section than in other portions. This is because of the protrusions P which overlie the slots thereby reducing the volume of mixture falling into the slots or zones of increased cross section to correspond to the linear volume that will be picked up and introduced into the mold cavity by the strictly flat portions of the plunger, i.e., the section between legs 70 of the plunger. Further, as the piston having the protrusions 72 moves forward to introduce the mixture into the mold cavity, there is produced a substantial modification of the transverse volumetric distribution of the admixture. Since the volume of material introduced into the mold cavity by the plunger corresponds to its thickness, irrespective of the distance it travels through the material, and since the cross-sectional area of the plunger is greater in the arced area over the legs than in the flat portion between them, the protrusions 72 on the tip of the plunger redistribute this excess volume to unify it with that of the flat portions. By reason of this action, precisely controlling the relative quantities of material introduced at points spaced transversely across the mold section, a board of uniform density may be produced.

Having described the invention in connection with certain specific embodiments thereof, it is to be understood that further modifications may now suggest themselves to those skilled in the art and it is intended to cover such modifications as fall within the scope of the appended claims.

What is claimed is:

1. Apparatus for extruding a composition board of ligno-cellulose fines and resins, said board being characterized by a panel having one plane surface and a plurality of longitudinally extending spaced parallel bars extending in perpendicular relation from one side of said plane surface and integral therewith, said apparatus comprising a frame, a first mold carried by said frame having a plurality of longitudinally extending grooves therein, a second mold spaced from said first mold a distance equal to the desired thickness of said panel, a feed chamber box immediately adjacent the inlet end of said second mold, and overlying the inlet end of said first mold, a piston comprising a plate having a plane surface dimensioned to pass between said second and first molds and a plurality of depending longitudinal legs aligned with and dimensioned to fit within the grooves of said first mold, means for reciprocating said piston, and means for varying the extent of the forward stroke of said piston during the operation of said piston with the return stroke of said piston terminating in alignment with the rear wall of said feed chamber box regardless of the length of the forward stroke.

2. The structure of claim 1 wherein said feed chamber box includes a front and rear wall and is provided with a plurality of agitating fingers, each agitating finger comprising a depending agitating rod extending into said feed chamber box, an upper body portion having a vertically elongated slot therein and an enlarged bore below said slot, and means for simultaneously oscillating and reciprocating said finger comprising parallel shafts extending through said bores and having eccentric cams thereon rotatable in said bores, pivot pins extending from said walls through said slots, pinions on each shaft, a reciprocable rack engaging said pinions, and means to reciprocate said rack to rotate said shaft and simultaneously to oscillate and reciprocate said fingers.

3. An apparatus as claimed in claim 1 wherein the means for varying the stroke of said mold piston includes a frame, a block, means on said frame supporting said block for linear sliding movement, a link arm having one end pivotally secured to said block, a crankshaft journalled in said frame, a connecting rod having one end journalled on said crankshaft and the opposite end journalled to the end of said link arm opposite said block, a link having one end journalled to the end of said connecting rod opposite said crankshaft and extending generally oppositely of said link arm, and adjustable means on said frame having the opposite end of said link journalled thereto for moving said link and thereby changing the stroke of said block.

4. The structure of claim 1 wherein means for heating said first and second mold are provided to cure the board during extrusion, and means are provided to heat said piston correspondingly to compensate for expansion of the mold structure.

5. The structure of claim 1 wherein the side walls of said grooves diverge at their outlet ends to relieve molding pressure on the perpendicular bars.

6. The structure of claim 1 wherein the outer end of the second mold is free to tilt away from said first mold at its outlet end to permit limited enlargement of that end of the mold cavity to release molding pressure on the plane surface of the panel, and manual control means are provided for tilting said outer end.

7. The structure of claim 6 wherein T-shaped guides are provided along each edge of the first mold having upstanding flanges to preclude space between the edges of the second and first molds when said second mold end is moved upwardly, said guides having their inner confronting edges tapering outwardly to relieve molding pressure on the edges of said plane surface.

8. The structure of claim 1 wherein protuberances are provided on the inlet edge of the second mold overlying the grooves in the first mold to restrict excessive concentration of fines into said grooves.

9. The structure of claim 1 wherein the leading edge of said piston is provided with a forwardly offset portion overlying each leg thereof, said offset portion having tapering side edges to diffuse excess fines overlying the grooves in said first mold into the lateral spaces therebetween to ensure even distribution of the material.

10. The structure of claim 1 wherein a rotary saw is movably mounted in cooperating relation with the outlet end of said mold, to sever said board into predetermined lengths, means for moving said saw at a speed equal to that of the extruded board to provide a uniform cut perpendicular to the longitudinal axis of the board, and means for returning the saw to its starting point after each cut.

11. A method of continuously extruding a composition board characterized by a severe cross-sectional shape including a plurality of integral angularly disposed planes, from a heterogeneous mixture of dry ligno-cellulose fine particles intermixed with resin, which comprises the steps of loosely feeding said dry mixture into a first mold cavity characterized by a plurality of angularly disposed forms while continuously agitating said dry mixture at a point immediately adjacent said cavity evenly to distribute the mixture into all of said angularly disposed forms while limiting the quantity distributed into any one form, feeding portions of said evenly distributed mixture between said first mold and a second mold by means of a constantly reciprocating piston while continuously heating said molds and said piston to a commensurate degree to provide even expansion of said molds and said piston while heat curing said mixture, varying the stroke of said piston during operation in accordance with the frictional resistance offered by differing portions of the heterogeneous mixture of dry fines to control the intensity of compaction by varying the relative distance of travel of different types of dry fines between said molds to produce a finished article of uniform density.

12. The method of claim 11 wherein the return stroke of the piston is terminated at a fixed point adjacent the end of said first mold cavity away from said second mold regardless of the length of the forward stroke to insure the introduction of a uniform quantity of said mixture upon each forward stroke.

13. In an apparatus having a piston for extruding through a mold composition board from a mixture of ligno-cellulose fines and resin the combination which comprises:

(a) a first mold structure having a first mold surface for forming a first surface on said board and of configuration conforming with the top of said piston, (b) a second mold structure spaced from said first mold structure to form an opening into a mold cavity and having an uneven transverse mold surface for forming an uneven transverse profile on a second surface of said board and of configuration conforming with the bottom of said piston, and (c) structure forming a feed path for said mixture leading to said opening between said first mold structure and said second mold structure through which said piston is reciprocated, said path being of configuration which is uneven adjacent to said opening.

14. Apparatus for extruding composition board from a mixture of ligno-cellulose fines and resin which comprises:

(a) a first mold structure having a first mold surface for forming a first surface on said board, (b) a second mold structure spaced from said first mold structure to form an opening into a mold cavity and having an uneven transverse mold surface for forming an uneven transverse profile on a second surface of said board, (c) structure forming a feed path for said mixture leading to said opening between said first mold structure and said second mold structure, said path being of configuration which is uneven adjacent to said opening, and (d) means including a piston structure having an uneven face and top and bottom surfaces conforming with said first mold structure and said second mold structure for mating with said opening to move said mixture therethrough.

15. Apparatus for extruding composition board from a mixture of ligno-cellulose fines and resin which comprises:

(a) a first mold structure having a first mold surface for forming a first surface on said board, (b) a second mold structure spaced from said first mold structure to form an opening into a mold cavity and having an uneven transverse mold surface for forming an uneven transverse profile on a second surface of said board, and (c) structure including a feed channel and a piston having an uneven face and top and bottom surfaces conforming with the surfaces of said first mold structure and said second mold structure, respectively, for delivering and distributing said mixture in said opening between the mold structures in volumes compensating for the effect of the variations in said uneven mold surface to produce board of said uneven profile with uniform cross-sectional density.

16. In an apparatus having a piston for extruding through a mold composition board from a mixture of ligno-cellulose fines and resin which comprises:

(a) a first mold structure having a smooth mold surface for forming a planar surface on said board and of configuration conforming with the top of said piston, (b) a second mold structure spaced from said first mold structure to form an opening into a mold cavity and having an uneven transverse mold surface for forming an uneven transverse profile on a second surface of said board and of configuration conforming with the bottom of said piston, and (c) structure forming a feed path leading to said opening between the mold structures through which said piston is reciprocated which path varies in area inversely with respect to variations in cross-sectional area of said opening.

17. Apparatus for extruding composition board from a mixture of ligno-cellulose fines and resin which comprises:

(a) a first mold structure having a first mold surface for forming a first surface on said board, (b) a second mold structure spaced from said first mold structure to form an opening into a mold cavity and having an uneven transverse mold surface for forming an uneven transverse profile on a second surface of said board, (c) structure for controlling the deposition of said mixture adjacent to said opening between the mold structures in uneven transverse volumetric distribution dependent upon lateral variations in the cross-sectional area of said opening, and (d) a piston reciprocable through the deposit of said mixture having structure for modifying the relative transverse volumetric distribution of said mixture upon movement thereof into said opening to form uniform density board of uneven cross section.

18. Apparatus for extruding composition board from a mixture of ligno-cellulose fines and resin which comprises:

(a) a first mold structure having a first mold surface for forming a first surface on said board, (b) a second mold structure spaced from said first mold structure to form an opening into a mold cavity and having slots in the surface for forming a ribbed transverse profile on a second surface of said board, (c) structure for controlling the deposition of said mixture adjacent to said opening between the mold structures in uneven transverse volumetric distribution dependent upon variations in the cross-sectional area of said opening, and (d) a piston reciprocable through the deposit of said mixture having forward protrusions positionally overlying the slots in said second mold structure for modifying the relative transverse volumetric distribution of said mixture upon each entry of said piston into said opening to form uniform density board of ribbed cross section.

19. The combination set forth in claim 18 in which the structure for controlling the deposition of said mixture adjacent to said opening between the mold structures includes protrusions extending into the path of said mixture at positions overlying both said slots in said second mold structure and the paths of the protrusions on said piston.

20. A method of continuously extruding a heterogeneous mixture of dry ligno-cellulose fine particles intermixed with resin through a mold cavity to form a composition board characterized by a severe cross-sectional variation including a plurality of integral angularly disposed planes, which comprises the steps of:

(a) loosely feeding said mixture onto a slotted up-facing surface of a first mold for deposit thereof adjacent to the mouth of said cavity in quantities proportional at each point to the distance across the mouth of said cavity, (b) continuously agitating said dry mixture at a point immediately adjacent said slotted surface to facilitate distribution of the mixture into the slots therein, (c) altering the lateral volumetric distribution of the deposit of said mixture within said mouth of said cavity during injection thereof into said cavity, and (d) forcing said mixture through said cavity while permitting continuous increase in thickness thereof beginning at the mouth of said cavity and until said mixture assumes a set.

21. The method of continuously forming a composition board having at least one surface of uneven transverse profile from a heterogeneous mixture of dry ligno-cellulose fine particles intermixed with resin by piston drive into and through a cavity between a pair of molds one of which has a surface corresponding with said uneven profile, which comprises:

(a) loosely feeding the dry mixture into a zone adjacent the mouth of said cavity, the bottom of which corresponds with said uneven profile, (b) continuously agitating said dry mixture to distribute the mixture into all of the crevices in said bottom, (c) altering the lateral volumetric distribution of the deposit of said mixture within said mouth of said cavity upon movement thereof into the mouth of said cavity, and (d) continuously heating said molds and the piston to a commensurate degree to provide even expansion thereof while heat curing said mixture.

22. A method of continuously extruding a composition board characterized by a severe cross-sectional shape including a plurality of integral angularly disposed planes from a heterogeneous mixture of dry ligno-cellulose fine particles intermixed with resin, which comprises the steps of:

(a) loosely feeding the dry mixture into a first mold characterized by a plurality of angularly disposed forms, (b) continuously agitating said dry mixture at a point immediately adjacent the cavity between said first mold and a second mold to distribute the mixture into all of said angularly disposed forms to deposit the mixture adjacent to the mouth of said cavity in quantity proportional at each point to the height of the opening of the mouth of said cavity, and (c) altering the lateral volumetric distribution of the deposit of said mixture while injecting said mixture into said cavity.

23. In an apparatus for extruding composition board of ligno-cellulose fines and resin, said board being characterized by a panel having a planar surface and the other surface of variable height relative to said planar surface, the combination comprising:

(a) a frame having a first mold with a first surface for forming said planar surface on one side of said board, (b) a second mold spaced from said first mold having an uneven transverse surface to form an uneven transverse profile on a second surface of said board, (c) means pivotally mounting said first mold for rotation about an axis at the entry to the cavity between the mold structures and coinciding with said planar surface, (d) lock means to secure said first mold at selectable positions, and (e) piston means having top and bottom surfaces conforming with said first surface and said uneven transverse surface, respectively, for forcing said fines through said apparatus.

References Cited by the Examiner
UNITED STATES PATENTS

| | | | |
|---|---|---|---|
| Re. 19,553 | 4/1935 | Pfohl | 18—12 |
| 2,126,869 | 4/1938 | Burchenal et al. | 264—176 |
| 2,177,681 | 10/1939 | Anderson | 207—10 |
| 2,369,359 | 2/1945 | MacWilliam | 18—12 |
| 2,370,469 | 2/1945 | Johnson | 18—12 |
| 2,494,413 | 1/1950 | Slettengren | 74—38 |
| 2,648,262 | 8/1953 | Croston et al. | 162—290 |
| 2,708,770 | 5/1955 | Harres et al. | 18—12 |
| 2,717,420 | 9/1955 | Roy | 18—12 |
| 2,730,760 | 1/1956 | Bibby | 18—12 |
| 2,784,453 | 3/1957 | Hjulian | 18—12 |
| 2,828,859 | 4/1958 | Emmerich | 207—10 |
| 2,851,888 | 9/1958 | Scholin | 74—38 |
| 2,854,696 | 10/1958 | Kreibaun | 18—47 |
| 2,877,491 | 3/1959 | Crafton | 264—176 |
| 2,885,730 | 5/1959 | Barley et al. | 18—12 |
| 2,892,352 | 6/1959 | Saalfrank | 74—44 |
| 2,992,152 | 7/1961 | Chapman | 18—47 |

J. SPENCER OVERHOLSER, *Primary Examiner.*

MORRIS LIEBMAN, MICHAEL V. BRINDISI,
*Examiners*